United States Patent [19]  
Rider

[11] 4,176,100  
[45] Nov. 27, 1979

[54] TEXTURED SURFACE COATING  
[75] Inventor: Nathan R. Rider, Sparta, Mich.  
[73] Assignee: Kay Tex Products, Inc., Grand Rapids, Mich.  
[21] Appl. No.: 948,291  
[22] Filed: Oct. 3, 1978  
[51] Int. Cl.$^2$ ............................................. C08L 91/00  
[52] U.S. Cl. ............................ 260/22 R; 260/29.6 H; 260/29.6 S; 260/42.52  
[58] Field of Search ............ 260/22 R, 29.6 H, 29.6 S, 260/42.52

[56] References Cited  
U.S. PATENT DOCUMENTS

| | | |
|---|---|---|
| 2,581,295 | 1/1952 | Redfarn . |
| 2,733,995 | 2/1956 | Robinson . |
| 2,905,566 | 9/1959 | Schmidt et al. . |
| 3,126,355 | 3/1964 | Birten et al. . |
| 3,305,506 | 2/1967 | Murray . |
| 3,677,988 | 7/1972 | Kimmel . |
| 3,712,825 | 1/1973 | Yocum . |
| 3,819,388 | 6/1974 | Cornwell . |

FOREIGN PATENT DOCUMENTS  
224866 7/1958 Australia .  
714782 9/1954 United Kingdom .

Primary Examiner—Lewis T. Jacobs

[57] ABSTRACT

The specification discloses a textured surface coating composition based on polyvinyl acetate and mineral fillers which is suitable for either spray or trowel application. Its mineral fillers include approximately 5 to 10 percent by weight acicular zinc oxide and the overall pigment volume concentration of the composition is from about 49 to about 53 percent. The major mineral components, sand and feldspar, have a particle size no larger than about 56 AFS grain fineness. From 1 to about 2 percent of an oil modified alkyd dispersion is employed as a dispersing agent and as a plasticizer and from about 1 to about 2 percent by weight of 2,2,4 trimethyl 1,3, pentanediol monoisobutyrate is employed as a coalescing agent.

22 Claims, No Drawings

TEXTURED SURFACE COATING

BACKGROUND OF THE INVENTION

The present invention relates to textured surface coatings based on polyvinyl acetate and mineral fillers. The mineral fillers typically include sand, feldspar, titanium dioxide, asbestos, cement, chopped fiberglass and the like in various combinations and percentages.

Durability and ease of application have been major problems with such prior art coatings. Surface cracking on aging, breakage when subjected to blows, mars and scrapes, "crows feet" and other surface imperfections have made it difficult to commercialize prior art compositions based on polyvinyl acetate and mineral fillers.

SUMMARY OF THE INVENTION

The present invention comprises a textured surface coating composition based on polyvinyl acetate and mineral fillers which is suited to either spray or trowel applications, depending on the mixing techniques to which it is subjected. It has excellent durability in comparison to prior art compositions.

Basically, durability and broad range ease of applicability are achieved by including approximately 5 to 10 percent by weight acicular zinc oxide in the mixture and maintaining an overall pigment volume concentration of from about 49 to about 53 percent. These factors are critical to the success of the present invention.

It is preferred that the composition include an oil modified alkyd dispersion as a combined dispersing agent and a plasticizer. While the use of zinc oxide increases surface hardness (and acts as a mildewcide), the oil modified alkyd dispersion acts as a dispersing agent for the zinc oxide and also acts as a plasticizer to increase the toughness and decrease brittleness of the textured coating.

It is preferred that the sand employed in the composition have a particle size no larger than about 56 AFS grain fineness to enhance the workability of the composition. It is also preferable to employ from about one to about two percent by weight of 2,2,4 trimethyl 1,3 pentanediol monoisobutyrate as a coalescing agent.

These and other aspects, objects, features and advantages of the invention will be more fully understood and appreciated by reference to the description of the preferred embodiment.

DESCRIPTION OF THE PREFERRED EMBODIMENT

The preferred embodiment textured surface coating composition of the present invention includes a polyvinyl acetate resin, either a homopolymer or copolymer or mixture of both, mineral fillers including from about 5 to about 10 percent by weight acicular zinc oxide, with the overall pigment volume concentration falling within the range of from about 49 to about 53 percent. The acicular zinc oxide provides surface hardness and acts as a mildewcide. By carefully controlling the pigment volume concentration within the critical range as described, one insures that the composition will be easy to apply, and one also optimizes the durability of the system, particularly with respect to aging durability.

It is important that the zinc oxide be acicular. The needle shaped crystals appear to maximize the surface hardness of the composition after it has dried in place.

The pigment volume concentration comprises the volume of pigment, i.e. mineral filler, divided by the sum of said volume plus the volume of resins and plasticizers, with the resultant number being multiplied by 100 so that it is expressed as a percent. By staying within the critical range of from about 49 to about 53 percent, one achieves both ease of application of the composition to a surface and enhanced durability. Cracking upon aging is minimized. The critical pigment volume concentration range combines with use of acicular zinc oxide to greatly enhance the usefulness of polyvinyl acetate and mineral filler compositions.

The major mineral fillers employed in the preferred embodiment, i.e. fillers exceeding 10 percent by weight, comprise sand at from 15 to 25 percent by weight and feldspar at from 10 to 20 percent by weight. The combined total of the two is such that upon combination with zinc oxide and perhaps other minor fillers, the total filler volume falls within the pigment volume concentration range. It is important that the major filler components, in this case sand and feldspar, have a particle size which does not exceed 56 AFS grain fineness. As a practical matter, commercially available feldspar falls well below this range, having a typical particle size of from about 20 to 25 microns. However, the particle size with respect to sand must be carefully controlled to ensure that 56 AFS grain fineness maximum is not exceeded.

Durability is also enhanced in the preferred embodiment through the use of from about 1 to about 2 percent of an oil modified alkyd dispersion. This serves as both a dispersion agent to assist in dispersing zinc oxide in the mixture and as a plasticizer. Thus the oil modified alkyd dispersion enhances durability of the composition in two respects. First, it assists in dispersion of the zinc oxide which is an important surface hardness element. Secondly, it imparts flexibility to the hardened composition since it acts as a plasticizer. The use of zinc oxide, the careful control of the pigment volume concentration and the use of an oil modified alkyd dispersion are all closely related in terms of achieving improved durability in the preferred embodiment composition of the present invention.

Another component which relates to surface appearance in a slightly different way is 2,2,4 trimethyl 1,3 pentanediol monoisobutyrate. From about 1 to about 2 percent by weight of this agent is employed in this composition as a coalescing agent. This relates to the surface texture of the hardened composition in that it minimizes the appearance of "crows feet". This particular coalescing agent has been found most preferred in the composition.

The other components employed in the preferred embodiment mixture are important, but are well known prior art components and are generally known for their use in textured surface coating compositions. These other components and all those discussed above, and their approximate preferred percentages by weight, are listed below:

| Component | Percentage By Weight |
|---|---|
| Glycol and surfactant mixture | 6.0% |
| Defoamer | .3% |
| Water | 16.6% |
| Oil modified alkyd dispersion | 1.7% |
| Asbestos | 4.2% |
| 2,2,4 Trimethyl 1,3 pentanediol monoisobutyrate | 1.6% |
| Zinc oxide | 6.6% |

| Component | Percentage By Weight |
|---|---|
| Titanium Dioxide | 2.3% |
| ⅛" chopped fiberglass | .9% |
| Hydroxyethylcellulose | .4% |
| Polyvinyl Acetate Monomer or Copolymer Resin | 28.4% |
| Feldspar | 13.3% |
| Sand | 17.7% |

The glycol and surfactant mixture can be commercially obtained in a premixed form from H. B. Fuller, as its ADA blend 919B. Hercules No. 357 defoamer is a commercially acceptable defoamer. A suitable commercial oil modified alkyd dispersion is Arolon 580 from Ashland. The asbestos is preferably about a 50/50 mixture of Union Carbide's Calidra RG 144 and Johns Manville's 7M13. The 2,2,4 trimethyl, 1,3, pentanediol monisobutyrate is available commercially as "Texanol" from Wolverine. Hydroxyethylcellulose is commercially available as "Natrasol" from Hercules and it is preferable to employ 4,400 cps viscosity grade. The polyvinyl acetate resin can be either a homopolymer or copolymer such as a polyvinyl acetate/ethylene emulsion. Suitable products included H. B. Fuller's SB 309 and Dupont's Elvace 1875. Lawson United Feldspar and Mineral Company's LU 400 Feldspar provides a suitable feldspar material. The remaining components are available form a large number of sources.

To prepare the composition, a portion of the glycol and surfactant mix (4.8% of the total composition by weight), the defoamer, a portion of the water, (13.8% of the total composition by weight), the oil modified alkyd dispersion, the asbestos and the 2,2,4 trimethyl, 1,3 pentanediol monoisobutyrate are mixed in a high speed "Patterson" mixer at 15,000 rpm for about 3 minutes. While still mixing, the zinc oxide, titanium dioxide and ⅛" chopped fiberglass are added. The mixture is ground in the high speed mixer until uniformly dispersed, which usually takes about 5 minutes.

Then, the mixture is transferred to a slow speed mixer where the rest of the water, the rest of the glycols and surfactants and the hydroxyethylcellulose are introduced to the mix. With the low speed mixer operating at from 700 to 800 revolutions per minute, the polyvinyl acetate resin and the major mineral fillers, namely sand and feldspar, are introduced and mixed in. Preferably, the resin is added first, followed by the feldspar, followed by the sand. Low speed mixing is then continued for about 15 minutes. Color adjustments are made at this time.

At this point, the composition can be removed and used as a spray-on surface coating composition. If one wants a trowel grade composition, one returns the mixture to the high speed mixer and subjects it to high speed mixing at 15,000 revolutions per minute for about 5 more minutes. Thus, the composition of the present invention can be either a spray composition or a trowel composition depending simply on whether or not it is subjected to a final high speed mix.

In determining the pigment volume concentration of the preferred embodiment mixture as set forth above, one would take the sum of the volume of the asbestos, the zinc oxide, the titanium dioxide, the fiberglass, the feldspar and the sand and divide it by the same volume plus the volume of polyvinyl acetate and oil modified alkyd dispersion. Naturally, the resultant figure would be multiplied by 100. One would not include in the composition the remaining minor ingredients or water which will ultimately evaporate from the composition and therefor not affect surface durability.

The relative quantities of asbestos, fiberglass and titanium dioxide can be varied up to 50% without significantly affecting the composition, although one must be careful to see that such variances do not take the mixture outside of the critical pigment volume concentration range. Similarly, the percentages of glycol and surfactant, defoamer, water and hydroxyethylcellulose are subject to such variations to achieve various processing or use results without adversely affecting the concept of the present invention. The specific amount of polyvinyl acetate resin employed is subject to variation as well, provided that such variation does not take the composition out of the critical pigment volume concentration range of 49 to 53%.

Of course, it is understood that the above is merely the preferred embodiment and that these and other variations and alterations can be made without departing from the spirit and broader aspects of the invention as set forth in the claims, as interpreted by law and in accordance with the doctrine of equivalence.

The embodiments of the invention in which an exclusive property or privilege is claimed are defined as follows:

1. A textured surface coating composition based on polyvinyl acetate and mineral fillers, the improvement in said composition comprising: said mineral fillers including from about 5 to about 10% by weight acicular zinc oxide; said composition having an overall pigment volume concentration of from about 49% to about 53%.

2. The textured surface coating composition of claim 1 which includes from about 1 to about 2% by weight of an oil modified alkyd dispersion as a dispersing agent and as a plasticizer.

3. The textured surface coating composition of claim 2 which includes from about 1 to about 2% by weight of 2,2,4 trimethyl 1,3 pentanediol monoisobutyrate as a coalescing agent.

4. The textured surface coating composition of claim 3 in which those of said mineral filler components which exceed 10% by weight of the composition have a particle size no greater than about 56 AFS grain fineness.

5. The textured surface coating composition of claim 4 in which said mineral fillers include from about 15 to about 25% by weight sand and from about 10 to about 20% by weight feldspar.

6. The textured surface coating composition of claim 5 which comprises: from about 4 to about 8% by weight of a mixture of glycol and surfactants, from about 15 to about 20% by weight of water and from about 25 to about 30% by weight of a polyvinyl acetate resin composition.

7. The textured surface coating composition of claim 6 in which said polyvinyl acetate resin and those of said mineral fillers which exceed 10% by weight of said composition are mixed into said composition in a low speed mixer at from about 700 to about 800 revolutions per minute; and wherein the final resultant mixture is subjected to high speed mixing at about 15,000 rpm for about 5 minutes to thereby give said composition a trowel grade consistency.

8. The textured surface coating composition of claim 1 which includes from about 1 to about 2% by weight of 2,2,4 trimethyl, 1,3 pentanediol monoisobutyrate as a coalescing agent.

9. The textured surface coating composition of claim 1 in which those of said mineral fillers which exceed 10% by weight of the composition have a particle size no greater than about 56 AFS grain fineness.

10. The textured surface coating composition of claim 1 in which said mineral fillers include from about 15 to about 25% by weight sand and from about 10 to about 20% by weight feldspar.

11. The textured surface coating composition of claim 1 in which said polyvinyl acetate resin and those of said mineral fillers which exceed 10% by weight of said composition are mixed into said composition in a low speed mixer at from about 700 to about 800 revolutions per minute; and wherein the final resultant mixture is subjected to high speed mixing at about 15,000 rpm for about 5 minutes to thereby give said composition a trowel grade consistency.

12. A method for producing a trowel grade textured surface coating composition from a sprayable textured surface coating composition comprising: mixing polyvinyl acetate and mineral fillers including from about 5 to about 10% by weight, based on the total composition weight, acicular zinc oxide in a low speed mixer at from about 700 to 800 revolutions per minute, maintaining the pigment volume concentration of the composition in a range of from about 49% to about 53%; followed by subjecting the resultant composition to high speed mixing at approximately 15,000 revolutions per minute for about 5 minutes.

13. The method of claim 12 which includes mixing into said composition prior to final high speed mixing step, from about 1 to about 2% by weight of an oil modified alkyd dispersion as a dispersing agent and as a plasticizer.

14. The method of claim 13 which includes mixing into said composition prior to said final high speed mixing step from about 1 to about 2% by weight of 2,2,4 trimethyl 1,3 pentanediol monoisobutyrate as a coalescing agent.

15. The method of claim 14 which includes using mineral filler components in excess of 10% by weight which have a particle size no greater than about 56 AFS grain fineness.

16. The method of claim 15 wherein said mineral filler components include from about 15 to about 25% by weight sand and from about 10 to about 20% by weight feldspar.

17. The method of claim 16 which includes mixing into said composition prior to said final high speed mixing step from about 4 to about 8% by weight of a mixture of glycol and surfactants, from about 15 to about 20% by weight water and from about 25 to about 30% by weight of said polyvinyl acetate resin composition.

18. The method of claim 12 which includes mixing into said composition prior to said final high speed mixing step from about 1 to about 2% by weight of 2,2,4 trimethyl 1,3 pentanediol monoisobutyrate as a coalescing agent.

19. The method of claim 12 which includes using mineral filler components in excess of 10% by weight which have a particle size no greater than about 56 AFS grain fineness.

20. The method of claim 12 wherein said mineral filler components include from about 15 to about 25% by weight sand and from about 10 to about 20% by weight feldspar.

21. The method of claim 12 in which the following components are added in the order indicated during the low speed mixing step: polyvinyl acetate, feldspar and sand.

22. The method of claim 21 which includes a first high speed mixing step prior to said low speed mixing step during which glycol and surfactants, water, an oil modified alkyd dispersion are first mixed, followed by the addition during said mixing step of said zinc oxide.

* * * * *